Patented May 14, 1946

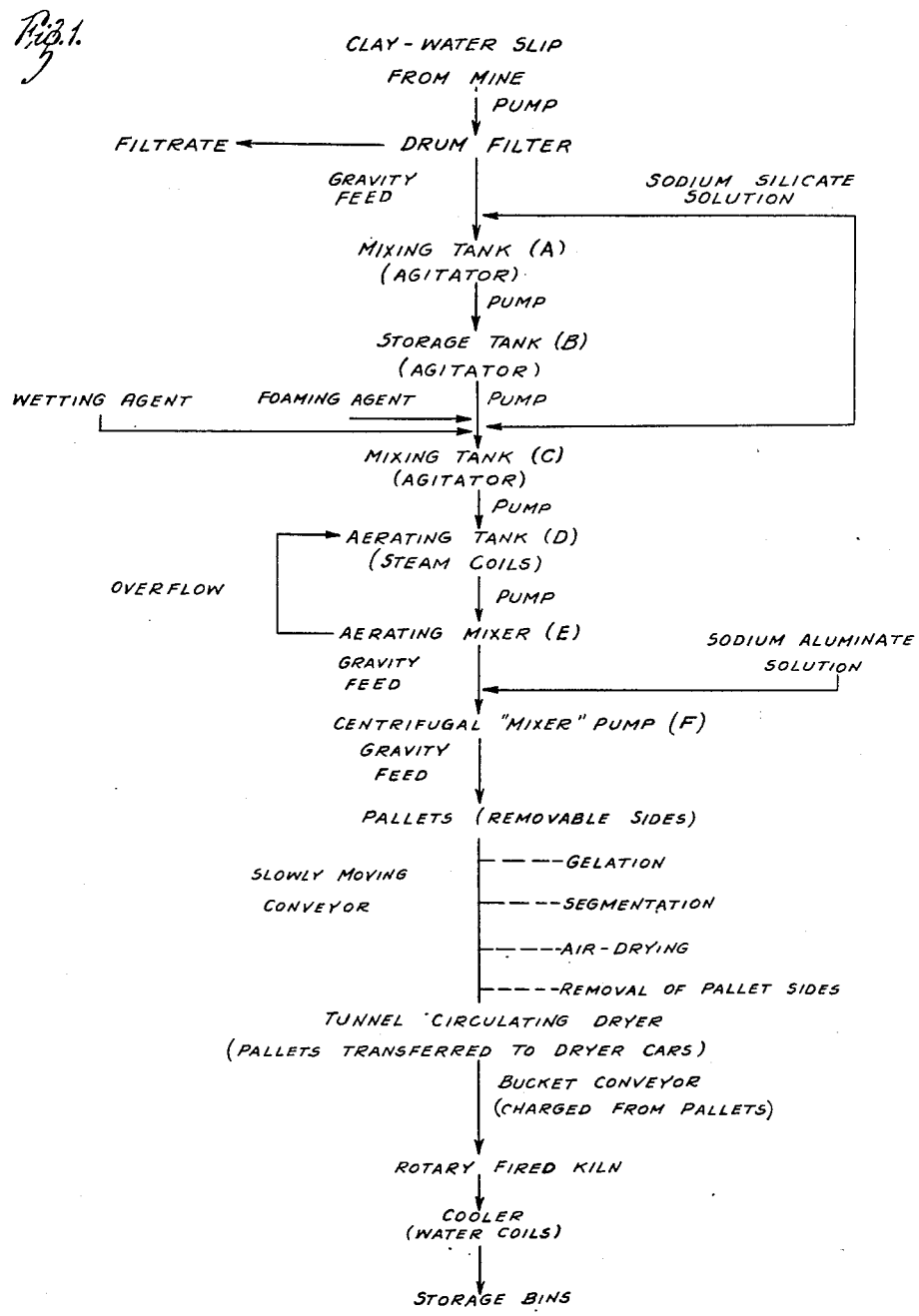

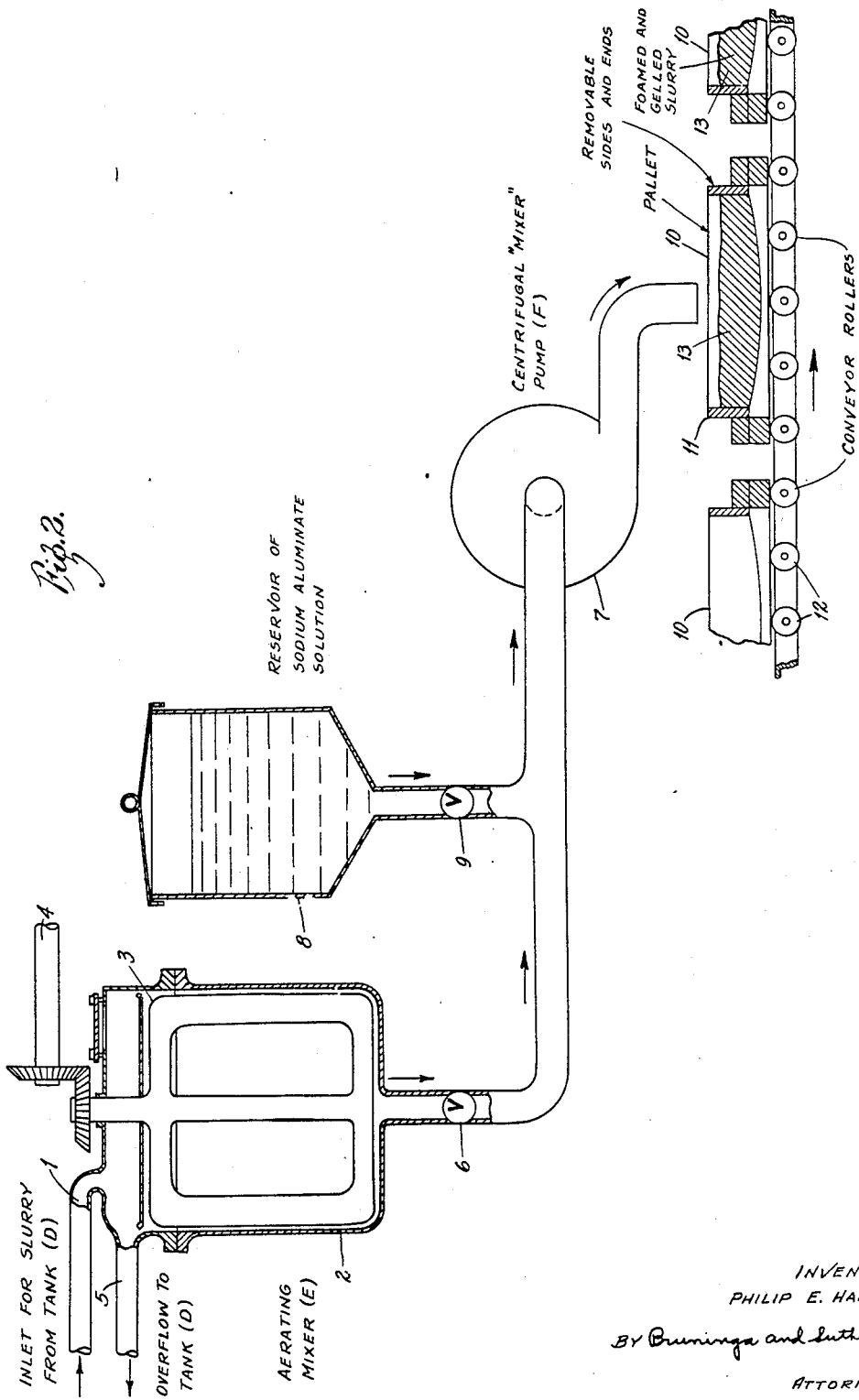

2,400,087

UNITED STATES PATENT OFFICE 2,400,087

LIGHT-WEIGHT CERAMIC MASS

Philip E. Harth, Greenwich, Conn.

Application July 8, 1943, Serial No. 493,855

21 Claims. (Cl. 106—40)

The present invention relates generally to light-weight ceramic aggregate and more particularly to the production of foamed, dried and fired ceramic zeolite gel aggregate.

The use of foam or other density-reducing substances, such as combustible solids of organic or vegetable origin in connection with ceramic materials, such as kaolin, fire-clay and grog, to form porous, cellular compositions when set and hardened to a final state has often been tried as a means of producing light-weight ceramic materials. Early efforts involving the incorporation of a tenacious foam in a slurry of argillaceous materials were unsuccessful as a result of excessive shrinking, lack of uniformity of expansion, poorly developed cell structure and low strength characteristics in the final products. Subsequent efforts to prevent excessive shrinking and cracking during the drying operation, for example by incorporating calcined gypsum or plaster of Paris, failed to provide light-weight ceramics having the desired uniform properties of high strength, a uniformly high degree of expansion and a discontinuous cell structure.

More recent efforts to provide a commercially feasible light-weight ceramic material involved the deflocculation of a clay mass, to provide a consistency at which aeration could be effected, aeration of the mass and subsequent flocculation of the aerated mass, to provide a degree of rigidity to retain the cellular structure resulting from the aeration. Processes of this type were disclosed in U. S. Patents Nos. 2,151,932 and 1,944,007. Deflocculation, or slip agents as they are known for this purpose, were alkalies, alkali metal salts of weak acids, such as sodium hydroxide and sodium silicate. Flocculation after aeration was effected by further addition of one or more of the slip agents or by addition of substances such as carbon dioxide, sodium chloride, calcium sulfate, aluminum sulfate or magnesium chloride. When sodium silicate is employed as the deflocculating agent and an acidic substance such as a weak acid or an acidic salt was employed as the flocculating agent, flocculation of the clay was probably accompanied by a gelation of the sodium silicate. It has been found that the formation of a silica gel in an aerated clay mass by the addition of an acidic substance to an aerated clay slip containing sodium silicate results in a state of gelation which fails to provide an adequate retention of the cellular structure in a uniform condition. Furthermore, when the material is dried and fired, the resulting product has been found to possess low strength characteristics and a strong tendency to disintegrate readily upon handling, with the production of small, sandy aggregates and fine particles. Under ordinary conditions when an acidic substance such as aluminum chloride is employed as the flocculating and gelling agent, the tendency is for complex silicates containing sodium, aluminum and silica to form in the clay mass. The gels thus produced are in general heterogeneous, discontinuous gels and have been found to result in dried and fired cellular ceramic products possessing to an even greater extent the same disadvantages which appear to be inherent in those products containing substantially a straight silicic acid gel.

One of the objects of this invention is to provide certain improvements in the production of foamed light-weight ceramic masses. A further object is to provide an improved light-weight ceramic material which has for its base a substantially homogeneous zeolite gel possessing substantial strength characteristics and substantial resistance to disintegration.

Another object is to provide a novel method for preparing improved light-weight ceramic masses having as a base a substantially homogeneous zeolite gel.

Another object is to provide improved light-weight ceramic masses which may be processed to produce articles possessing improved characteristics.

Another object is to provide improved light-weight ceramic masses possessing novel characteristics which render them particularly adapted to certain purposes.

Further objects will become apparent to those skilled in the art from the following disclosure:

Figure 1 is a flow sheet of a commercially successful embodiment of the invention, and Figure 2 is a structural view of a part of the arrangement of Figure 1.

In accordance with the present invention, generally stated, a foamed homogeneous zeolite gel is prepared. The foamed zeolite gel is dried and fired to produce a light-weight mass which is found to possess substantial strength and substantial resistance to disintegration as a result of subsequent handling. Fillers, such as kaolin, raw clay, fired clay, grog, cullet, bentonite, calamine, kyanite, alumina, asbestos fibres, flue dust, raw or calcined limestone or dolomite, vermiculite, various minerals, asbestos, glass or mineral fibers or a mixture of any of these materials, may be incorporated in the zeolite gel.

The zeolite gel may be formed by mixing a water solution of sodium silicate with a water solution of sodium aluminate. In general, gelation tends to take place over a period of time after the solutions are mixed. One or more fillers may be incorporated with either solution before the solutions are mixed. As an alternative, the quantity of filler may be divided and the portions incorporated in the respective solutions before the solutions are mixed.

The mixture of zeolite-forming solutions is aerated to develop a cellular structure therein. A foaming agent, desirably an organic foaming agent, such as monobutyl-phenylphenol-sodium monosulfonate, dibutyl - phenylphenol - sodium monosulfonate, sulfonated alcohols, sodium resinate or a mixture of any of these wetting agents is desirably employed to insure the attainment of a desirable cellular structure. Sodium resinate produces a desirable bonding effect in the drying of the foamed mass. Other dry bonding agents may be employed with the foaming agents, for example, starch or dextrin.

As one method of operation, a fully set gel may be prepared by mixing the reacting solutions and allowing the mixture to stand until gelled. The gel is then agitated by any suitable means, such as a mechanical stirrer, to effect disintegration of the gel structure. A foaming agent is added and agitation is provided, for example, in a beater type of mixer, until the desired cellular structure is developed in the mass. At this point a filler may be added while the mass is being agitated and agitation continued until a uniform dispersion of the filler in the mass is attained. Heat may be applied if desired to increase the fluidity of the gel either before or after the filler is added. The resulting material is then allowed to dry and is subsequently fired at a suitable firing temperature, for example, 2800° F.

It is characteristic of the homogeneous zeolite gels of the present invention that these gels in the wet state are thixotropic. When these gels are disintegrated, as for example, by agitation, they tend to reunite into a homogeneous gel mass upon standing. This characteristic of these gels distinguishes them from the silica gels of the prior art, including silicic acid gels and complex heterogeneous gels formed by mixing silicates with metal salts.

An alternative method of operation comprises mixing the zeolite-forming solutions and adding a foaming agent and, if desired, a filler with agitation so that uniformity of dispersion of the constituents and development of the cellular structure take place before gelation of the mass is complete. In a variation of this method, the filler may be incorporated in either of the reacting solutions prior to their combination and likewise the foaming agent, or the filler and foaming agent, may be divided between the solutions. As a further variation, the zeolite-forming solutions may be mixed, a foaming agent added and the mixture agitated to develop the desired cellular structure. Before gelation takes place, a filler may be incorporated in the foamed mass. Thereafter the mass is allowed to stand until gelation is complete.

Although a number of chemicals may be combined to produce zeolite gels, it has been found particularly desirable in the practice of the present invention to form the zeolite gel by reacting water solutions of sodium aluminate and sodium silicate. These substances combine to form zeolites over a wide range of compositions. The gelation rate, gel rigidity and fusion characteristics of the resulting gel vary according to the soda-alumina-silica ratios combined. For the purposes of the present invention, gels having ratios of $Al_2O_3$ to $SiO_2$ in the range of 1–3 to 1–5 were found to provide the best operating conditions. An increase in the proportion of $Al_2O_3$ tends to increase the rate of gelation and to produce a more refractory gel. An increase in the proportion of $SiO_2$ tends to retard gelation, to decrease refractoriness and to provide a gel which is stronger in the dry state. The rate of gelation was found to be indirectly proportional to the soda content of the gel and to the refractoriness of the gel. The drying of the foamed zeolite gel tends to stabilize the gel for subsequent firing at elevated temperatures such as 2500–2800° F. If the gel tends to fuse too readily, it is difficult to fire it at 2800° F. without clinkering. On the other hand, if the gel formed is too refractory, the 2800° F. heat treatment tends to produce insufficient fusion of the gel to enable it to bond the filler, resulting thereby in a product having low strength and poor resistance to disintegration.

In addition to the ratios of $Al_2O_3$ to $SiO_2$ set forth hereinbefore, ratios of 1 to 20, and particularly of 1–10 are also contemplated as within the scope of the present invention. Foamed zeolite gels having these ratios require more time for gelation. Heating of the reacting solutions will usually decrease gelation time. Auxiliary agents such as sodium chloride may also be incorporated to accelerate gelation characteristics. The higher silica ratio gels will generally require lower firing temperatures.

In the practice of the present invention, several types of commercially available sodium aluminate were found particularly desirable. It has been found that any of the commercial grades can be utilized. One which has been used commercially for the process contains only approximately 60% soluble $Na_2O.Al_2O_3$, the balance consisting of iron, $Al_2O_3$, $SiO_2$ and $TiO_2$ as insolubles. One particularly suitable type comprises a 100% soluble material analyzing at approximately 80% $Na_2O.Al_2O_3$ and 20% $H_2O$. A second very suitable type comprises a sodium aluminate solution containing 32% $Na_2O.Al_2O_3$, 8% $NaOH$ and 50% $H_2O$. A particularly desirable sodium silicate solution was found to be one analyzing at 29% $SiO_2$, 9% $Na_2O$ and 62% $H_2O$, known to the trade as Philadelphia Quartz "N" Brand.

In place of sodium aluminate and sodium silicate, other substances capable of forming true homogeneous zeolite gels may be employed. For example, aluminum chloride or aluminum sulfate may be substituted for sodium aluminate. Colloidal silica solutions, such as those disclosed in U. S. Patent No. 2,244,325, consisting of aqueous solutions containing from 5 to 20% of silica present as a stable, ion-depleninshed inorganic silica hydrosal and as little as 0.02% of cations expressed as sodium carbonate may be substituted for sodium silicate. The pH of the zeolite-forming solutions may be adjusted to reduce the rate of gelation to a feasible rate for a given set of operating conditions. The proportions of the substitute materials are calculated on the basis of the ratio of $Al_2O_3$ to $SiO_2$ necessary to produce a true zeolite gel within the desired range of proportions as hereinbefore stated.

The ratio of water to gel solids in the practice of the present invention may be varied over a wide range. The rate of gelation is indirectly proportional to the ratio of water-to-gel solids.

Excessively low water-to-gel solids ratios tend to result in incomplete reaction of the zeolite-forming solutions with a resulting separate precipitation of silica and alumina hydrous oxide gels instead of a true homogeneous zeolite gel. Such a mixture of silica and alumina gels results in the formation of curds which afford little if any bonding to fillers. Moreover, such products when dried and fired possess poor strength and poor resistance to disintegration.

In general, gels having higher ratios of $Al_2O_3$ to $SiO_2$ require more water in proportion to total gel solids to produce the true zeolite gels contemplated in the present invention. Also, fillers which tend to subdivide as a result of the action of the electrolyte on the filler, and fillers which absorb water continuously over a prolonged period may eventually reduce the water available for zeolite formation to such an extent as to influence materially the gelation characteristics of the zeolite, resulting thereby in the formation of curdy precipitates instead of homogeneous zeolite gels. This may be avoided by using a small excess of water over the minimum calculated for true zeolite gel formation. For example, with a raw clay filler, a slurry of 60% clay and 40% water has been found to approach the maximum degree of plasticity commensurate with satisfactory gelation. If, for any reason, this slurry becomes too hot during the processing operations, the water absorption characteristics of the clay may be augmented and the consistency of the slurry thereby increased. When these circumstances are found to interfere with satisfactory gelation, the addition of water has been found to remedy the difficulty.

A desirable range of consistency for good gelation characteristics may be achieved by employing the following proportions:

| | |
|---|---|
| Total water | 750–1200 parts by weight |
| Filler | 400–1000 parts by weight |
| Zeolite solids | 2–10% of filler weight |
| Foaming agent | 0.01–0.04% of filler weight |

The foregoing table is based upon the use of a filler of the type represented by kaolin. Fired products containing as much as 98% kaolin and 2% zeolite gel solids were found to possess desirable strength characteristics for use as calcined insulating aggregate. Stronger dried or dried and fired bodies may be obtained by increasing the content of zeolite gel or by producing a zeolite gel higher in silica. A suitable kaolin for use as a filler in the practice of the present invention was found to be one having the following analysis:

| | | |
|---|---|---|
| Moisture on ignition | per cent | 13.65 |
| $SiO_2$ | do | 41.70 |
| $Al_2O_3$ | do | 41.53 |
| Balance ($Fe_2O_3$, CaO, MgO, $TiO_2$, $K_2O$, $Na_2O$) | per cent | 3.0 |
| Softening point—cone 34 | °F | 3200 |

The temperature of the zeolite-forming solutions tends to affect the rate of gelation. A particularly desirable range of temperature is the range between 100–120° F. Above 120° F. the gels tend to become less rigid. Temperatures below 100° F. are feasible as long as the slower rate of gelation is consistent with available facilities for operation. In general, gels having a higher water content are more rigid at elevated temperatures. Temperatures above 100° F. are in general advantageous in the foaming operation because the action of the foaming agent is more rapid under such conditions.

In general, the operation of drying the foamed zeolite gels is comparable to the drying operation involved with other types of ceramic products containing water to the extent of 40% or more. Excessively rapid drying and differential drying are to be avoided. A reasonable rate and temperature of drying results in products relatively free from ruptures and strains. Heat penetration should be gradual and uniform on all surfaces. Segmentation of the partially dried product tends to facilitate uniform drying. The drying and firing operations are analogous to those encountered in all plastic ceramic processes and their handling will be evident to those skilled in the ceramic arts.

The product of the present invention is in general a very hard aggregate containing a multiplicity of very fine voids or cells uniformly distributed throughout the aggregate. A microscopic examination reveals that the voids or cells are substantially discontinuous. The size of the voids or cells may be varied by altering the foaming conditions, such as the proportion of foaming agent, the rate of agitation and the temperature of the slurry. A reduction of porosity by using a higher kiln temperature or a less refractory filler or zeolite gel tends to produce an aggregate which is substantially impervious to water.

The following examples will serve to illustrate the process and products of the present invention. These examples are to be construed merely as illustrative and not as limiting the scope of the invention.

Example I 31.5 grams of a sodium silicate solution having an $SiO_2$ content of 9.135 grams and an $Na_2O$ content of 2.835 grams are dissolved in 800 cc. of water. To this solution is added a solution of 1 cc. of monobutyl-diphenyl-sodium monosulfonate in 50 cc. of water. The resulting mixture is agitated in a suitable manner, for example, in a beater type of mixer, until a cellular foam is uniformly developed throughout the mixture to the extent desired. To the foamed mixture is slowly added with stirring 1000 grams of a kaolin having the following analysis:

| | | |
|---|---|---|
| $SiO_2$ | per cent | 41.70 |
| $Al_2O_3$ | do | 41.53 |
| Moisture on ignition | do | 13.65 |
| Balance ($Fe_2O_3$, CaO, MgO, $TiO_2$, $K_2O$, $Na_2O$) | per cent | 3.0 |
| Softening point—cone 34 | °F | 3200 |

Agitation of the foamed mass is continued until a uniform dispersion of the kaolin in the mixture is attained. To the resulting mass is added 10 grams of sodium aluminate having a content of $Na_2O.Al_2O_3$ of approximately 80% and the balance approximately 20% water, dissolved in 200 grams of water. The sodium aluminate solution is dispersed throughout the mass as rapidly and thoroughly as possible, for example with the aid of efficient agitation such as that obtained with a motor-driven spiral agitator. The resulting mixture is then allowed to stand until gelation has taken place. After uniform and thorough gelation has been attained, the mass is dried at 150–250° F. and fired at a temperature within the range of 2000–2800° F., for example, at 2500° F. The resulting light-weight ceramic mass was found to contain 1000 grams of kaolin and 20 grams of a zeolite gel having an analysis as follows:

| | Grams |
|---|---|
| Na₂O | 5.87 |
| Al₂O₃ | 4.96 |
| SiO₂ | 9.14 |

This corresponds to a molal ratio of $Al_2O_3$ to $SiO_2$ of approximately 1 to 3.

Example II

A commercially successful embodiment of the present invention is represented diagrammatically in the flow sheet of Figure 1 of the accompanying drawings. Kaolin from the mines is transported to the operation by pipe-line in the form of a slip containing approximately 18% of kaolin and 82% of water. The slip is dewatered on a drum-type suction filter to a consistency represented by the proportions of approximately 60% of kaolin and 40% of water. As the resulting mud leaves the drum filter, it is mixed with 10 pounds of sodium silicate solution per ton of dry clay in the mud. The sodium silicate solution employed contained 29% of $SiO_2$, 9% of $Na_2O$ and 62% of water, known to the trade as Philadelphia Quartz "N" Brand. The silicate and kaolin mixture is agitated in a mixing tank, designated in Figure 1 as A, until a uniform slurry is obtained. From mixing tank A the slurry is pumped to a large storage tank B having a capacity of approximately 20,000 gallons. This tank is equipped with a slowly moving agitator which is maintained in motion continuously. The slurry in storage tank B is pumped as required into a small mixing tank C having a capacity of approximately 3000 gallons. As the slurry enters tank C, 50 pounds of sodium silicate solution having the aforedescribed analysis, 2 pounds of a wetting agent comprising a mixture of sodium salts of decyl and dodecyl benzene sulfonic acids, and 2 pounds of sodium resinate are added to the slurry per ton of dry kaolin in the slurry. Mixing tank C is equipped with an agitator to effect rapid mixing of the constituents of the mixture. Some degree of foaming is accomplished in tank C. The foam thus formed tends to consolidate in large bubbles and to rise to the surface of the slurry. From this tank the partially foamed slurry is pumped into an aerating tank D, which has a capacity somewhat larger than that of tank C and is equipped with steam coils and an agitator. A moderate rate of agitation, somewhat in excess of that provided in tank C, is provided to effect the formation and dispersion of small air bubbles throughout the slurry and to break up the larger bubbles formed in the partial foaming operation accomplished in tank C. The temperature is controlled by regulating a flow of steam through the steam coils, and is maintained at a point below 115° F. within the slurry to promote the formation of air bubbles without preventing ultimate gelation of the mass.

The extent of development of the cellular structure in the foamed slurry at any stage of the process may be measured by determining the specific gravity of a specimen portion of the slurry by any suitable method, such as the usual pycnometer method. For example, a typical specific gravity for the slurry in storage tank B is approximately 1.75. It is desirable in the majority of instances to reduce the specific gravity of the slurry by stages in mixing tank C, aerating tank D and in subsequent operations so that the final slurry will have a specific gravity as low as 0.35.

An even more profuse foaming is accomplished by pumping the slurry from aerating tank D to an aerating mixer E and agitating the slurry therein. The slurry undergoing agitation in aerating mixer E is continuously recirculated to aerating tank D during the operation of the aerating mixer E. The profuse foaming attained in aerating mixer E together with the continuous recirculation to aerating tank D tends to reduce the bubble size continuously and to disperse the foam uniformly throughout the slurry. The rate of agitation in aerating mixer E may be varied within the range of 150–500 revolutions per minute, depending upon the extent of foaming desired, as measured by the specific gravity of the slurry. It is desirable for the ultimate preparation of lightweight products having a low specific gravity to provide a foamed slurry in aerating mixer E having a specific gravity of approximately 0.60.

Aerating mixer E is designated in Figure 2 of the accompanying drawings by the numeral 2. The mixer is of the bread-mixer type, having a capacity of approximately 3500 gallons and equipped with an inlet connection 1 for the slurry which is pumped to the mixer 2 from aerating tank D. The mixer has a flat-sided double-bladed agitator 3 which is gear-driven from a power shaft 4. The mixer is equipped with an over-flow 5 which is connected by suitable means, such as pipes, to aerating tank D. From the mixer 2 the slurry is piped to the centrifugal "mixer" pump F, designated by the numeral 7 in Figure 2. Valve 6 controls the flow of the slurry to pump 7. Before the slurry from the aerating mixer 2 reaches the pump 7, a sodium aluminate solution is added to the slurry from a reservoir 8. The flow of this solution is controlled by means of a valve 9 at the bottom of the reservoir 8.

The aqueous sodium aluminate solution which is fed into the slurry ahead of the centrifugal mixer pump 7 contains 12 pounds per gallon of sodium aluminate having an analysis of approximately 80% $Na_2O.Al_2O_3$ and 20% water, known to the trade as No. 680. From 12 to 15 pounds of this sodium aluminate solution is fed from the reservoir 8 to the slurry for each 60 pounds of sodium silicate present in the slurry, with the result that each 2000 pounds of kaolin filler is dispersed in approximately 33 pounds of zeolite gel solids when the mass sets ultimately. The zeolite gel thus formed has a ratio of $Al_2O_3$ to $SiO_2$ of approximately 1 to 3.

The centrifugal "mixer" pump 7 is a centrifugal pump of the usual type which is employed as a mixer rather than as a pumping device. As a matter of fact, the use of this type of pump on a profusely foamed slurry of the type obtained from the aerating mixer 2 results in substantially no pumping action. In the present example, the slurry flows through the centrifugal pump as a result of pressure induced by gravity feed. If, in a given plant installation, pumping is required at this stage, it is necessary to employ a pump such as the gear type.

It is a feature of the present invention to achieve a very rapid and thorough mixing of the foamed silicate-filler slurry with sodium aluminate solution in order that a truly homogeneous zeolite gel phase will result when the foamed slurry undergoes gelation. It has been found that this may be accomplished in a commercial installation by passing the foamed slurry containing sodium aluminate through a centrifugal pump. Other means for effecting a rapid and intimate mixture of the zeolite gel-forming reactants are contemplated as being within the scope of the present invention. As an alternative to the use of one centrifugal pump as a mixing device, a series of such pumps may be employed, or the series of centrifugal mixer pumps may be alternated with other devices suitable for the purpose. In addition to producing a very thorough, rapid and intimate mixture of the zeolite-forming reactants, the centrifugal "mixer" pump serves further to decrease the bubble size and to disperse the foam throughout the slurry in a minimum of time.

As the foamed zeolite-forming kaolin-filled slurry leaves the centrifugal "mixer" pump 7, it is fed into pallets 10 having removable side and end frames 11 about 4 inches high. These pallets 10 are positioned on a roller conveyor 12 and are moved mechanically from the filling position along the roller conveyor 12. The conveyor 12 is of sufficient length to permit gelation of the foamed slurry 13 in the pallets 10 to take place to an extent which will permit the partially gelled mass to be cut into segments 1½ inches square on the top dimension to facilitate drying. Referring again to Figure 1 of the accompanying drawings, at the end of the roller conveyor, the side frames are removed from the rigid segments and the pallets are placed in dryer cars and the cars are passed through a tunnel circulating dryer. After 16–20 hours of drying at 250° F., the segments are dumped from the pallets into a bucket conveyor and transported therein to a 60 foot rotary kiln heated to approximately 2800° F. The segments pass through the kiln in 30–45 minutes. From the kiln, the segments are carried through a water cooler of conventional type. After leaving the cooler, the segments are transported to storage bins or directly to shipping facilities as desired. The material which leaves the kiln is in the form of aggregates having an average diameter in excess of one inch. Less than 10% of the kiln product is sufficiently small to pass through a 4 mesh screen. There are substantially no fines in the kiln product. Other characteristics of the ultimate product are shown in the following table:

Fusion point_____°F__ 3100–3200
Volume shrinkage (48 hours at temperature):
    2300° F_____ None
    2500° F_____per cent__ 1–2
    2600° F_____do____ 2–5
    3000° F. (16 hours)_____do____ 5–10

Weight per cubic foot of sized aggregate:
    Through 2 mesh on 4 mesh____pounds__ 23
    Through 6 mesh on 8 mesh_____do____ 28
    Through 8 mesh on 12 mesh_____do____ 29
    Through 12 mesh on 20 mesh_____do____ 32
    Through 20 mesh on 40 mesh_____do____ 33
    Through 40 mesh on 60 mesh_____do____ 38

The bulk weight of kaolin grain without the foamed zeolite gel solids but with the same heat treatment as the zeolite aggregate is shown in the following table:

Weight per cubic foot of sized aggregate:

Pounds
    Through 6 mesh on 8 mesh_____ 73
    Through 12 mesh on 20 mesh_____ 76

As an alternative to the process described in Example II and Figures 1 and 2 of the accompanying drawings, a commercially successful production of the light-weight ceramic product is achieved by mixing dry clay, sodium silicate solution and a foaming agent in an aerating mixer of the type illustrated in Figure 2, numeral 2. The resulting foamed slurry is then conveyed to a second aerating mixer of a similar type, for example, a "Hobart" mixer and the sodium aluminate solution is added to the slurry during the aeration operation in the second mixer. The same general procedure may be practiced both as the continuous operation described in Example II and as a batch operation.

One of the important uses of the light-weight ceramic products of the present invention is as aggregate material for the production of refractory castables. It has been the practice heretofore to make so-called castable mixtures by incorporating broken-up light-weight refractories of the prior art in hydraulic cement slurries, molding or casting the slurry in suitable forms such as brick, blocks and refractory articles of various shapes and subsequently drying and firing the molded masses. The porous light-weight aggregate prepared by processes of the prior art are high in specific gravity and low in strength and insulating value. The pores of the material available heretofore commercially are formed in general by incorporating combustible materials in a ceramic slurry and subsequently burning out the combustibles. The pore structure of such materials is substantially continuous. When such material is used in a hydraulic cement slurry, the slurry permeates the pores of the ceramic aggregate, thereby further decreasing the insulating value and increasing the specific gravity or bulk density of the resulting product. For the manufacture of aggregate of the prior art types now available commercially, from six to nine days are required as compared with approximately sixteen to twenty-one hours for the product of the present invention. Labor costs and equipment layout are considerably reduced by the use of the process of the present invention. Moreover, the product of the present invention is substantially higher in insulating value and lower in bulk density than any of the products prepared by commercially operated processes of the prior art. In addition the process of the present invention may be employed very successfully with kaolin as a filler, thereby using one of the most abundant high grade refractory clays available in the United States. Heretofore, kaolin has been little used in refractory processing because of certain manufacturing disadvantages. The process of the present invention provides an excellent use for this material in the production of refractories for which large demands now exist.

The light-weight ceramic aggregate of the present invention has been found well-suited as aggregate for castables which are used in sea-going vessels and in metallurgical operations. The low bulk density of the aggregate imparts substantially greater insulating value to the refractory castable and thereby conserves fuel and contributes less weight to the refractory installations on ships. Furthermore, the time required to fire up is less when such castables are employed. The usual castable mixture consists of from 4 to 8 volumes of light-weight aggregate sized continuously approximately to the following grading:

Per cent by
                                          volume
Coarser than 8 mesh_____ 50
Finer than 8 mesh, coarser than 100 mesh_____ 35
Finer than 100 mesh_____ 15

This aggregate is mixed with one volume of calcium aluminate cement or other suitable cement. The commercially available sized aggregate of the prior art has an average bulk density of 40-50 pounds per cubic foot. The aggregate of the present invention has a density of 30-35 pounds per cubic foot.

The light-weight ceramic material prepared by the process of the present invention also has utility in the production of insulating plastic refractories. In this instance the aggregate is substituted directly for all or a portion of the dense grain normally employed for this purpose. Moreover, the foamed zeolite-forming slurry, containing a suitable filler such as kaolin, fire-clay or any of the filler hereinbefore described, may be cast and processed directly for the manufacture of insulating fire brick.

Heretofore, it has been uneconomical to dry-press an insulating fire brick. The light-weight aggregate of the present invention may be incorporated in clay or other suitable bonding materials to produce mixtures which can be fabricated into fire brick without the necessity of the subsequent finishing operations of sawing or grinding to size.

In addition to the uses hereinbefore described, the light-weight kaolin-filled zeolite gel products of the present invention are also useful as fillers for plastics, as catalyst carriers or catalysts in chemical reaction towers, for sewage filtration beds, for non-refractory insulating cement structures, for acoustic tile or blocks, as sand blast aggregate, for non-skid surfaces, as carriers for dehydrating gels and as insulating coatings for cement shingles or walls.

The term "zeolite gel" as used in describing and claiming the present invention is intended to define any hydrous oxide gels embodying a relatively stable combination of three or more elements in gel form which, if properly treated, will possess a pronounced capacity for base-exchange reaction, although the final products of the present invention do not possess such base-exchange reactivity. These gels, however, are not to be confused with mixtures of gel precipitates or of one-constituent gels such as alumina or silica gel.

While in the foregoing description a complete disclosure of the process of preparing improved light-weight ceramic materials has been given, it is readily apparent that the invention is not limited to the particular proportions, to the particular materials, or to the particular sequence of steps described herein for the purpose of illustration. Those skilled in the art will readily understand that the process and manufacture may be modified and varied to provide a desired set of properties in the ultimate product, or in the interest of economy, without departing from the spirit of this invention; and it is therefore to be distinctly understood that the invention is not limited to the details of the foregoing disclosure except as indicated in the appended claims.

The invention having thus been described, what is claimed is:

1. A light-weight aggregate comprising a ceramic foamed mass, said mass being formed by rapidly mixing an aqueous solution of an aluminum compound with an aqueous solution of an oxy-silicon compound, said aluminum and oxy-silicon compounds being co-reactable to form a zeolite and mixed in proportions such that a true zeolite gel is formed, foaming said mass in a series of at least two stages of agitation in the presence of at least one wetting agent, and successively drying and firing said foamed gel mass.

2. A light-weight aggregate comprising a ceramic foamed mass, said mass being formed by foaming an aqueous solution of a zeolite-forming reactant in the presence of at least one wetting agent in a series of at least two stages of agitation, rapidly mixing the foamed mass with a zeolite-forming co-reactant in proportions such that a true zeolite gel is formed, said reactant and co-reactant being one an oxy-silicon compound and the other an aluminum compound, and successively drying and firing said foamed gel mass.

3. A light-weight aggregate comprising a ceramic foamed mass, said mass being formed by foaming an aqueous solution of a zeolite-forming reactant in the presence of at least one wetting agent and a filler in a series of at least two stages of agitation, rapidly mixing the foamed mass with a zeolite-forming co-reactant in proportions such that a true zeolite gel is formed, said reactant and co-reactant being one an oxy-silicon compound and the other an aluminum compound, and successively drying and firing said foamed gel mass.

4. A light-weight aggregate comprising a ceramic foamed mass, said mass being formed by foaming an aqueous solution of a zeolite-forming reactant in the presence of at least one wetting agent and a filler in a series of at least two stages of agitation, rapidly mixing the foamed mass with a zeolite-forming co-reactant in proportions such that a true zeolite gel is formed, said reactant and co-reactant being one an oxy-silicon compound and the other an aluminum compound, aerating said mixture, and successively drying and firing said foamed gel mass.

5. A light-weight aggregate comprising a ceramic foamed mass, said mass being formed by foaming an aqueous solution of a zeolite-forming reactant in the presence of at least one wetting agent and a filler in a series of at least two stages of agitation, mixing the foamed mass with a zeolite-forming co-reactant in proportions such that a true zeolite gel is formed, said reactant and co-reactant being one an oxy-silicon compound and the other an aluminum compound, passing said foamed gel through a zone of forced, turbulent flow, and successively drying and firing said foamed gel mass.

6. A light-weight aggregate comprising a ceramic foamed mass, said mass being formed by rapidly mixing an aqueous solution of an aluminum compound with an aqueous solution of an oxy-silicon compound, said aluminum and oxy-silicon compounds being co-reactable to form a zeolite and mixed in proportions such that a true zeolite gel is formed, agitating said gel to a thixotropic semi-liquid state, said liquified gel containing at least one foaming agent and at least one filler, said gel mass having been foamed in a series of at least two stages of agitation, and successively drying and firing said foamed gel mass.

7. The process of preparing a light-weight ceramic foamed mass which comprises foaming an aqueous solution of a zeolite-forming reactant in the presence of at least one wetting agent in a series of at least two stages of agitation, rapidly mixing the foamed mass with a zeolite-forming co-reactant in proportions such that a true zeolite gel is formed, said reactant and co-reactant being one an oxy-silicon compound and the other an aluminum compound, and successively drying and firing said foamed gel mass.

8. The process of preparing a light-weight ceramic foamed mass which comprises foaming an aqueous solution of a zeolite-forming reactant in the presence of at least one wetting agent and a filler in a series of at least two stages of agitation, rapidly mixing the foamed mass with a zeolite-forming co-reactant in proportions such that a true zeolite gel is formed, said reactant and co-reactant being one an oxy-silicon compound and the other an aluminum compound, and successively drying and firing said foamed gel mass.

9. The process of preparing a light-weight ceramic foamed mass which comprises foaming an aqueous solution of a zeolite-forming reactant in the presence of at least one wetting agent and a filler in a series of at least two stages of agitation, rapidly mixing the foamed mass with a zeolite-forming co-reactant in proportions such that a true zeolite gel is formed, said reactant and co-reactant being one an oxy-silicon compound and the other an aluminum compound, aerating said mixture, and successively drying and firing said foamed gel mass.

10. The process of preparing a light-weight ceramic foamed mass which comprises foaming an aqueous solution of a zeolite-forming reactant in the presence of at least one wetting agent and a filler in a series of at least two stages of agitation, mixing the foamed mass with a zeolite-forming co-reactant in proportions such that a true zeolite gel is formed, said reactant and co-reactant being one an oxy-silicon compound and the other an aluminum compound, passing said foamed gel through a zone of forced, turbulent flow, and successively drying and firing said foamed gel mass.

11. The process of preparing a light-weight ceramic foamed mass which comprises rapidly mixing an aqueous solution of an aluminum compound with an aqueous solution of an oxy-silicon compound, said aluminum and oxy-silicon compounds being co-reactable to form a zeolite and mixed in proportions such that a true zeolite gel is formed, agitating said gel to a thixotropic semi-liquid state, incorporating in said liquified gel at least one foaming agent and at least one filler, foaming said gel mass in a series of at least two stages of agitation, and successively drying and firing said foamed gel mass.

12. A light-weight aggregate comprising a ceramic foamed mass, said mass being formed by rapidly mixing an aqueous solution of sodium aluminate with an aqueous solution of sodium silicate in the proportions of $Al_2O_3$ to $SiO_2$ within the range of 1–3 to 1–20, foaming the reaction mixture in a series of at least two stages of agitation in the presence of at least one wetting agent, aerating said reaction mixture, and successively drying and firing the foamed gel mass.

13. A light-weight aggregate comprising a ceramic foamed mass, said mass being formed by rapidly mixing an aqueous solution of sodium aluminate with an aqueous solution of sodium silicate in the proportions of $Al_2O_3$ to $SiO_2$ within the range of 1–3 to 1–10, foaming the reaction mixture in a series of at least two stages of agitation in the presence of at least one wetting agent, aerating said reaction mixture, and successively drying and firing the foamed gel mass.

14. A light-weight aggregate comprising a ceramic foamed mass, said mass being formed by rapidly mixing an aqueous solution of sodium aluminate with an aqueous solution of sodium silicate in the proportions of $Al_2O_3$ to $SiO_2$ within the range of 1–3 to 1–5, foaming the reaction mixture in a series of at least two stages of agitation in the presence of at least one wetting agent, aerating said reaction mixture, and successively drying and firing the foamed gel mass.

15. A light-weight aggregate comprising a ceramic foamed mass, said mass being formed by rapidly mixing an aqueous solution of sodium aluminate with an aqueous solution of sodium silicate in the proportions of $Al_2O_3$ to $SiO_2$ within the range of 1–3 to 1–5, incorporating kaolin in the reaction mixture in the proportion of 90–98% of kaolin to 2–10% of zeolite gel solids, based on the combined weight of kaolin and gel solids, foaming the reaction mixture in a series of at least two stages of agitation in the presence of at least one wetting agent, aerating the reaction mixture, and successively drying and firing the foamed gel mass.

16. A light-weight aggregate comprising a ceramic foamed mass, said mass being formed by foaming an aqueous solution of sodium aluminate in the presence of at least one wetting agent and kaolin in a series of at least two stages of agitation, rapidly incorporating an aqueous solution of sodium silicate in the proportions of $Al_2O_3$ to $SiO_2$ within the range of 1–3 to 1–5, the total zeolite gel solids being 2–10% of the combined weight of kaolin and zeolite gel solids, aerating the reaction mixture, and successively drying and firing said foamed gel mass.

17. A light-weight aggregate comprising a ceramic foamed mass, said mass being formed by foaming an aqueous solution of sodium silicate in the presence of at least one wetting agent and kaolin in a series of at least two stages of agitation, rapidly incorporating an aqueous solution of sodium aluminate in the proportions of $Al_2O_3$ to $SiO_2$ within the range of 1–3 to 1–5, the total zeolite gel solids being 2–10% of the combined weight of kaolin and zeolite gel solids, passing the foamed reaction mixture through a zone of forced, turbulent flow, and successively drying and firing said foamed gel mass.

18. The process of preparing a light-weight ceramic foamed mass which comprises rapidly mixing an aqueous solution of sodium aluminate with an aqueous solution of sodium silicate in the proportions of $Al_2O_3$ to $SiO_2$ within the range of 1–3 to 1–10, foaming the reaction mixture in a series of at least two stages of agitation in the presence of at least one wetting agent, and successively drying and firing the foamed gel mass.

19. The process of preparing a light-weight ceramic foamed mass which comprises rapidly mixing an aqueous solution of sodium aluminate with an aqueous solution of sodium silicate in the proportions of $Al_2O_3$ to $SiO_2$ within the range of 1–3 to 1–5, incorporating kaolin in the reaction mixture in the proportion of 90–98% of kaolin to 2–10% of zeolite gel solids, based on the combined weight of kaolin and gel solids, foaming the reaction mixture in a series of at least two stages of agitation in the presence of at least one wetting agent, and successively drying and firing the foamed gel mass.

20. The process of preparing a light-weight ceramic foamed mass which comprises foaming an aqueous solution of sodium aluminate in the presence of at least one wetting agent and kaolin in a series of at least two stages of agitation, rapidly incorporating an aqueous solution of sodium silicate in the proportions of $Al_2O_3$ to $SiO_2$ within the range of 1–3 to 1–5, the total zeolite gel solids being 2–10% of the combined weight of kaolin and zeolite gel solids, aerating the reaction mixture, and successively drying and firing said foamed gel mass.

21. The process of preparing a light-weight ceramic foamed mass which comprises foaming an aqueous solution of sodium silicate in the presence of at least one wetting agent and kaolin in a series of at least two stages of agitation, rapidly incorporating an aqueous solution of sodium aluminate in the proportions of $Al_2O_3$ to $SiO_2$ within the range of 1–3 to 1–5, the total zeolite gel solids being 2–10% of the combined weight of kaolin and zeolite gel solids, passing the foamed reaction mixture through a zone of forced, turbulent flow, and successively drying and firing said foamed gel mass.

PHILIP E. HARTH.